J. N. WARNER.
UNIVERSAL TEST INDICATOR.
APPLICATION FILED DEC. 28, 1912.

1,139,936.

Patented May 18, 1915.
3 SHEETS—SHEET 1.

WITNESSES:
J. H. Perrault
M. E. Broesamle

INVENTOR
JOSEPH N WARNER
BY
E. S. Wheeler, ATTORNEY

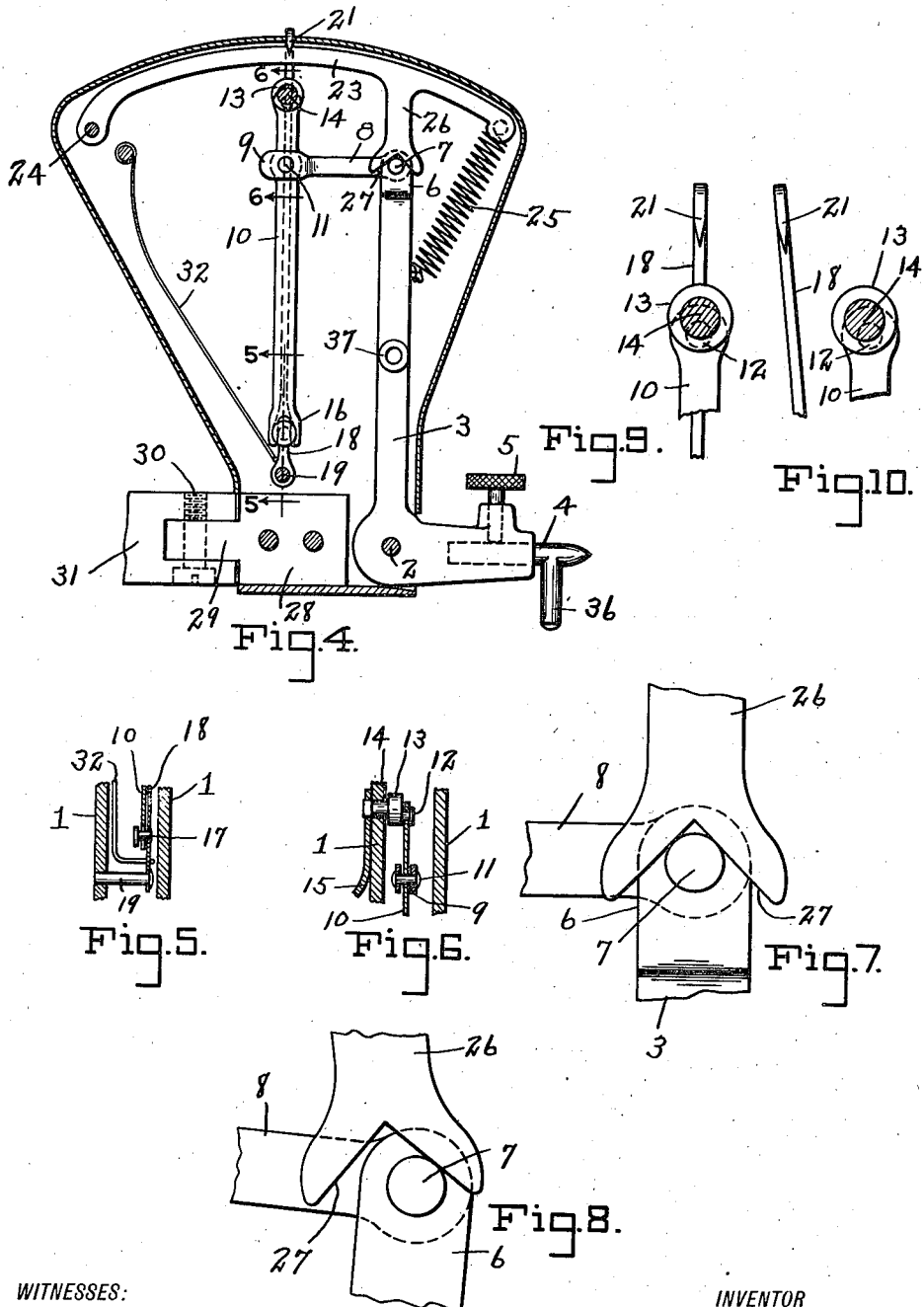

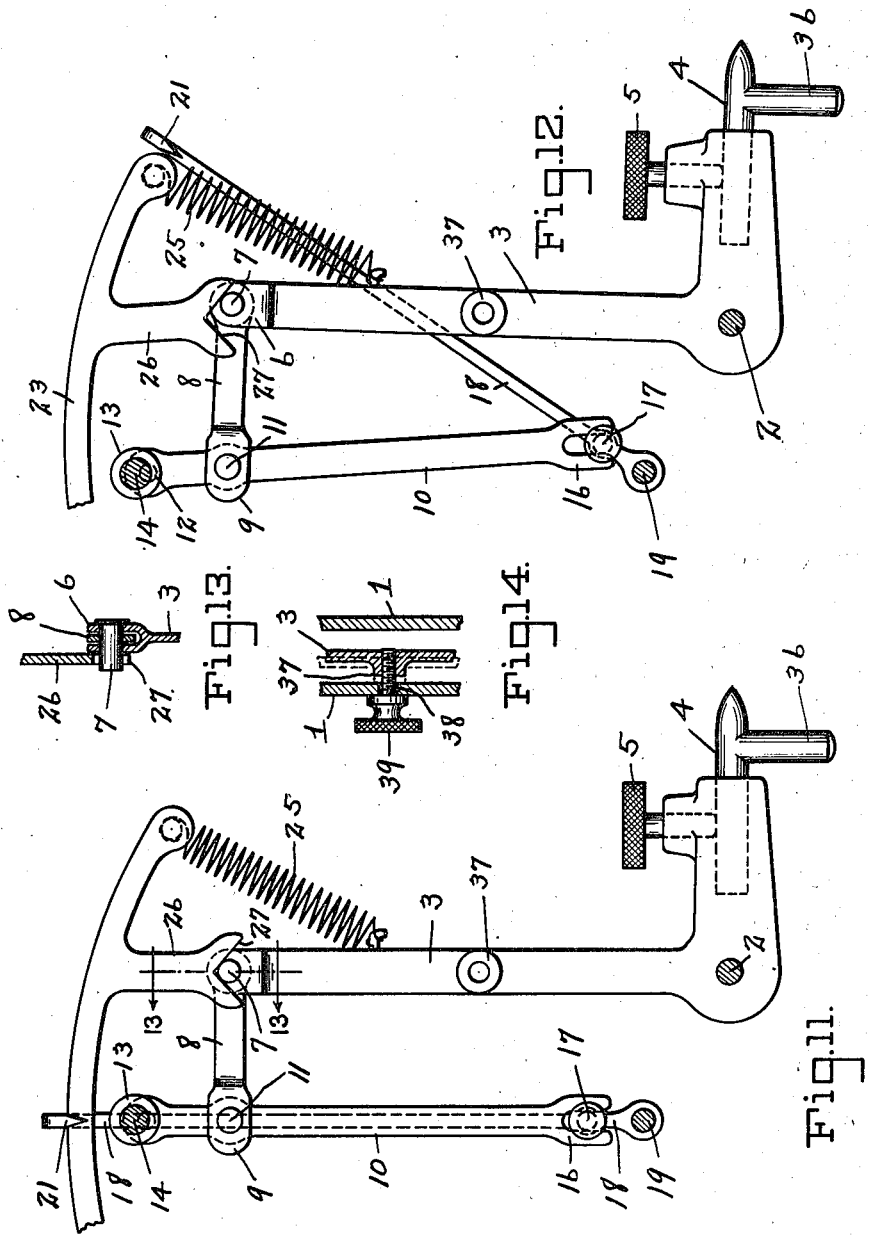

UNITED STATES PATENT OFFICE.

JOSEPH N. WARNER, OF DETROIT, MICHIGAN.

UNIVERSAL TEST-INDICATOR.

1,139,936.    Specification of Letters Patent.    Patented May 18, 1915.

Application filed December 28, 1912. Serial No. 738,973.

*To all whom it may concern:*

Be it known that I, JOSEPH N. WARNER, a citizen of the United States, residing at Detroit, in the county of Wayne, State of Michigan, have invented certain new and useful Improvements in Universal Test-Indicators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a universal test indicator especially designed for use in connection with height gages, but adaptable for other purposes, and consists in the construction and arrangement of parts herein more fully set forth and pointed out particularly in the claims.

The object of the invention is to provide a simple, efficient and convenient device for finding accurately the variations of dimensions or of a surface to the fractional part of a thousandth of an inch or its equivalent within the limits of the instrument. The invention further contemplates such an arrangement that when the instrument is used in connection with a height gage, or similar tool. it will measure quickly and accurately the distance between the center lines of conical surfaces, between parallel plane surfaces, and between the center line of a conical surface and a plane surface, etc.

The above object is attained by the structure illustrated in the accompanying drawings, in which :—

Figure 1:
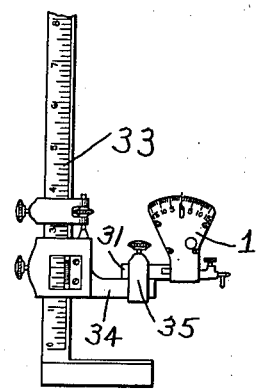
Figure 3:
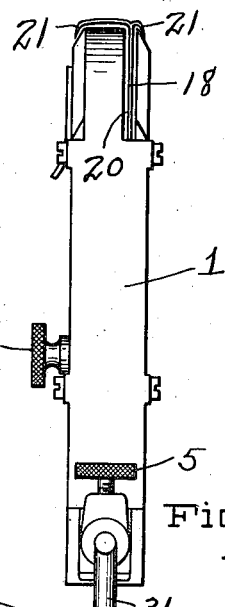
Figure 2:
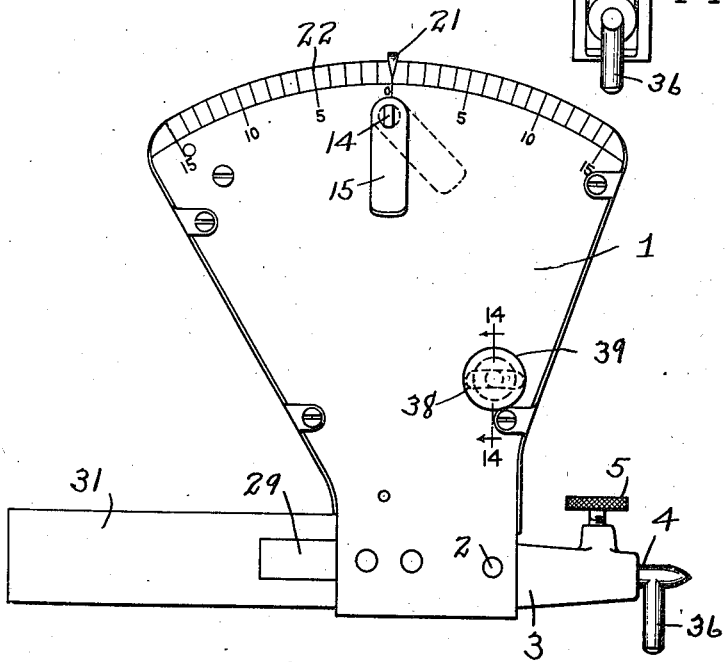

Figure 1 is a general view showing the application of my improved test indicator when used in connection with a height gage. Fig. 2 is an enlarged side elevation of the test indicator. Fig. 3 is an edge elevation thereof. Fig. 4 is a vertical section through the case, showing the operative parts in elevation therein. Fig. 5 is a fragmentary view in section as on line 5—5 of Fig. 4. Fig. 6 is a fragmentary view in section as on line 6—6 of Fig. 4. Fig. 7 is a fragmentary view in elevation showing the connection between the bell crank lever and the centralizing lever with the parts at rest. Fig. 8 is a similar view showing the position of the parts when the bell crank lever is moved in one direction. Fig. 9 is a fragmentary view in section through the fulcrum pin of the multiplying lever to which said lever is eccentrically pivoted. Fig. 10 is a fragmentary view illustrating how the pointer may be swung by a movement of the eccentric fulcrum of the multiplying lever. Fig. 11 is an enlarged fragmentary view, mainly in elevation, of the operative parts within the case when at rest. Fig. 12 is a similar view illustrating the movement of said parts. Fig. 13 is a fragmentary view in section as on line 13—13 of Fig. 11. Fig. 14 is a fragmentary view in section as on line 14—14 of Fig. 2.

Referring to the drawings by the characters of reference marked thereon, 1 designates a suitable case in which are located the mechanical parts, through the medium of which the variations in a piece of work to be tested are multiplied. Fulcrumed at 2, between the sides of the case 1, is a bell crank lever 3, having a horizontal portion projecting laterally from the base of the case, and a vertical portion extending within the case to a proper height therein. Within the outer end of the horizontal portion of the bell crank lever is a socket adapted to receive a tool 4 of a suitable form for testing or measuring the work, said tool being held in place by a set screw 5 or other suitable means. The upper end of the bell crank lever is forked as shown at 6, and pivoted in said fork upon a transverse pin 7 is one end of a horizontal link 8. The opposite end of the link 8 is forked, as shown at 9 and embraces a vertically disposed multiplying lever 10, to which it is pivotally connected by a transverse pin 11, which, in the operation of the device, becomes the point of the application of power. The upper end of the multiplying lever 10 is fulcrumed upon a pin 12 eccentrically disposed in a disk 13 on a rotatable stud 14 journaled in one side of the case 1. The outer end of the stud 14 projects beyond the face of the case and is squared to receive an arm 15 which may be swung to turn said stud and swing the eccentric fulcrum pin 12 of the multiplying lever 10 for purposes hereinafter stated.

The lower end of the lever 10 is forked as shown at 16 and sits astride of a headed pin 17 projecting laterally from the pointer arm 18 near its lower end, the lower end of said pointer arm being pivoted upon a transverse pin 19 extending between and mounted in the sides of the case. The upper end of the pointer arm projects through a slot 20 in the top of the case and is bifurcated to form two pointer ends 21 that are adapted to sweep the graduations 22 that are formed upon opposite sides of the case at the top to produce a scale divided into spaces representing one-thousandth of an inch, or a fractional part thereof, as may be desired. It will be noted that the graduated arc on the frame or case is concentric with the axis of oscillation of the pointer arm. It will now be understood that a vertical movement of the tool 4 will cause the bell crank lever to swing on its fulcrum and move the upper end thereof in the arc of a circle concentric with said point of fulcrum. This movement through the medium of the link 8 is imparted to the multiplying lever 10 which is of the third order. The movement of the multiplying lever is again multiplied in the pointer arm to which the multiplying lever is connected, thereby causing the point 21 to sweep a considerable portion of the graduated arc for a comparatively slight movement of the tool 4.

It will be noted that the graduated scale is numbered from the center in both directions from 0 to 15, thus giving a plus and a minus reading from the zero point.

For the purpose of centralizing the pointer arm after being moved in either direction from the central position, there is employed a curved centralizing lever 23 which is fulcrumed at 24 within the case, and which, at its free end is connected by a spring 25 with the bell crank lever 3. Depending from the centralizing lever, near its free end, is an arm 26 having a V-shaped notch 27 in its lower end which sits astride of the projecting end of the pivot pin 7 which connects the bell crank lever to the link 8. The tension of the spring 25 normally keeps the pin 7 seated in the crotch of the V-shaped notch 27, thereby holding the bell crank lever and multiplying lever in vertical parallelism and maintaining the pointer arm centrally of the graduated arc, as clearly shown in Figs. 2, 4 and 11.

Rigidly mounted in the base of the case is a block 28 having a laterally projecting tongue 29. Hinged to said tongue upon a vertical bolt or pintle 30 is a bar 31 for holding the indicator. A tension spring 32 for taking up the lost motion in the joints of the mechanism for multiplying the variations in the work is mounted in the case and connected with the pointer arm 18 at a point near its pivot 19.

Fig. 1 illustrates the use of this invention in connection with a height gage of common construction, the hinged bar 31 of the test indicator being clamped to the horizontal bar 34 of said gage which is made vertically adjustable thereon by means of a suitable clamp 35. In testing the indent of a center punch in a piece of work, to determine the correctness of its location with respect to the center, the indicator is moved upwardly on the height gage to the proper height and the point of the tool 4 is introduced into the indent of the center punch as the work is revolved. The hinge connection between the tongue 29 and the bar 31 allows for lateral deflections, while the pivotal point 2 of the bell crank lever permits of a vertical movement of the tool 4, the two joints effecting a universal joint connection between the point of the tool and the height gage. If the indent of the center punch be off center the bell crank lever will be oscillated upon its fulcrum 2 and the oscillatory movement of said lever will be multiplied in the multiplying lever and in the pointer arm 18 to cause the pointer 21 to traverse the scale, the reading on the scale indicating the extent of the variation to the fraction of one-thousandth of an inch. As soon as the tool is removed from the work, the tension of the spring 25 will cause the pin 7 at the upper end of the bell crank lever to seat in the crotch of the notch in the arm of the centralizing lever and return the pointer on the pointer arm to the zero position in the center of the scale. In testing the irregularities of a surface, a tool having a depending point 36 is passed over the surface of the work, the travel of the pointer on the scale indicating the irregularities thereof, as will be understood.

It has been stated that the fulcrum of the multiplying lever 10 is eccentric to the axis of the stud 14. The purpose of this is to allow the pointer to be returned to the zero point irrespective of the irregularity in the work, for instance, should an application of the tester show a plus or a minus reading on the scale, by rotating the stud 14 the fulcrum of the multiplying lever 10 may be shifted to compensate for the variation and restore the pointer 21 to the zero point from a deflection in either direction therefrom, thus enabling the operator in his calculation to always work from the zero point. Another purpose of the eccentric mounting of the fulcrum of the multiplying lever is to enable the operator to employ the whole arc of the scale from either terminal. As an illustration, with the pointer at zero, by rotating the stud 14, the fulcrum of the multiplying lever 10 may be shifted to the right or to the left such distance as to swing the pointer arm on the pivot pin 19 and cause the pointer to move to the limit of its travel in either direction from the zero point, in which position it may be used as long as desired, thus affording the operator the full range of the scale.

Formed on one side of the bell crank lever 3 is a tapped boss 37. The opening in said boss registers with a slot 38 (see Figs. 2 and 14) formed in the wall of the case, through which a thumb screw 39 may be passed and screwed into the boss 37. By this means the bell crank lever 3 may be locked to the side of the case to prevent movement thereof when it is desired to render the tool 4 rigid. By this arrangement the operator can go up or down on a height gage and scribe a line with the point of said tool a certain distance above a surface, or lines may be scribed on a piece of work a certain distance apart, etc.

It will of course be understood that any form or style of tool may be employed in the end of the bell crank lever that the character of the work may require, and that there are many other uses to which the test indicator may be put than those herein described.

Having thus fully set forth my invention, what I claim as new, and desire to secure by Letters Patent, is:—

1. In a test indicator, a suitable case, a bell crank lever fulcrumed therein adapted to carry a testing tool, a multiplying lever fulcrumed in said case, means connecting said levers, a graduated arc, a pivoted pointer arm having a pointer adapted to traverse said arc, and connecting means between said multiplying lever and said pointer arm.

2. In a test indicator, a pivotally mounted work engaging member, a scale, a pointer movable on said scale, mechanism connecting said pointer with said testing tool to multiply the movement of said tool in said pointer, a frame carrying said mechanism, a fixed support, and a pivot connecting said support and frame.

3. In a test indicator, a testing tool movably mounted to conform to the variations of the work, a multiplying lever, means effecting a jointed connection between said tool and lever to multiply the movement of the former in the latter, a scale, a movable pointer adapted to traverse said scale, a jointed connection between the multiplying lever and the pointer, and means for shifting the fulcrum of said lever.

4. In a test indicator, a case, a pivotally mounted member within the case, a testing tool carried by said member, a scale on the case, a movable pointer adapted to traverse the scale, means effecting a jointed connection between said pointer and tool-carrying member, and means for locking said tool carrying member against movement.

5. In a test indicator, a bell crank lever adapted to carry a testing tool, a multiplying lever jointedly connecting to the bell crank lever, a scale, a pointer arm having a pointer adapted to traverse said scale, means effecting a jointed connection between the multiplying lever and the pointer arm, a centralizing lever connected with the bell crank lever, and means for yieldingly maintaining said parts in working relation.

6. In a test indicator, the combination of a support, a work engaging member pivotally mounted on the support, means to lock the same against movement, a movable indicator, and means effecting a jointed connection between the indicator and the work engaging member.

7. In a test indicator, the combination of a support, a work engaging member pivotally mounted on the support, a movable indicator, a multiplying lever pivoted to said frame to connect the indicator and work engaging member, and means for normally maintaining the indicator in any predetermined position but permitting it to move either way therefrom.

8. In a test indicator, the combination of a support, a work engaging member pivotally mounted on the support, a movable indicator, means to connect the indicator and work engaging member to cause them to move together, and eccentric means for causing the indicator to move independent of the work engaging member.

9. In a test indicator, the combination of a support, a member pivotally mounted on the support and adapted to engage the work, a movable indicator, means to connect the indicator and work engaging member to cause the indicator to move by reason of the engagement of said member with the work, and eccentric means for causing the indicator to move independently of the testing tool.

10. In a test indicator, means adapted to carry a testing tool, said means having jointedly connected thereto a multiplying lever, a scale, an indicating member adapted to traverse the scale, means for effecting a jointed connection between the multiplying lever and the indicating member, a centralizing lever connected with the tool-carrying means, and means for yieldingly maintaining said parts in working relation.

11. In a test indicator, means for carrying a testing tool, said means having connected thereto a multiplying lever, a scale, an indicating member adapted to traverse the scale, means for effecting a jointed connection between the multiplying lever and the indicating member, a centralizing member connected with the tool-carrying means, and means for yieldingly maintaining said parts in working relation.

In testimony whereof, I sign this specification in the presence of two witnesses.

JOSEPH N. WARNER.

Witnesses:
  A. W. DAVIS,
  M. E. BROESAMLE.